(12) United States Patent
Sakai (10) Patent No.: US 9,316,472 B2
(45) Date of Patent: Apr. 19, 2016

(54) SLIDE GUIDE DEVICE

(71) Applicant: MITUTOYO CORPORATION, Kawasaki-shi, Kanagawa (JP)

(72) Inventor: Hisayoshi Sakai, Kawasaki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 0 days.

(21) Appl. No.: 14/471,631

(22) Filed: Aug. 28, 2014

(65) Prior Publication Data

US 2015/0063730 A1 Mar. 5, 2015

(30) Foreign Application Priority Data

Sep. 2, 2013 (JP) ................................. 2013-181461

(51) Int. Cl.
| | | |
|---|---|---|
| *F16C 27/02* | (2006.01) | |
| *G01B 3/20* | (2006.01) | |
| *F16C 29/00* | (2006.01) | |
| *F16C 29/02* | (2006.01) | |
| *F16C 29/12* | (2006.01) | |
| *F16C 32/06* | (2006.01) | |

(52) U.S. Cl.
CPC ................ *G01B 3/20* (2013.01); *F16C 29/002* (2013.01); *F16C 29/005* (2013.01); *F16C 29/02* (2013.01); *F16C 29/123* (2013.01); *F16C 32/0614* (2013.01); *F16C 32/0666* (2013.01); *F16C 2370/00* (2013.01)

(58) Field of Classification Search
CPC ...... F16C 29/004; F16C 29/005; F16C 29/02; F16C 29/025; F16C 32/0603; F16C 32/0607; F16C 32/0614; F16C 32/0618; F16C 32/0622; F16C 32/0625; F16C 32/0677; F16C 32/0678
USPC ................................................ 384/12, 26, 37
See application file for complete search history.

(56) References Cited

U.S. PATENT DOCUMENTS 3,272,568 A * 9/1966 Walther et al. .................... 384/8
3,578,827 A * 5/1971 Smith ............................ 384/12
4,653,408 A * 3/1987 Nagashima et al. ............ 108/20

FOREIGN PATENT DOCUMENTS

JP 61-17613 5/1986
JP 62-241629 10/1987

* cited by examiner

*Primary Examiner* — Phillip A Johnson
(74) *Attorney, Agent, or Firm* — Rankin, Hill & Clark LLP (57) ABSTRACT

A slide guide device includes: a guide body having a reference guide surface and a sub guide surface that are parallel to each other; a slider having a reference slide pad adapted to slide on the reference guide surface and a sub slide pad adapted to slide on the sub guide surface, the slider being adapted to be driven by a drive unit to move along the guide body. The sub slide pad includes a slide surface (sub slide surface) slidable on the sub guide surface and an air pocket that receives a load in a manner non-contact with the sub guide surface.

5 Claims, 10 Drawing Sheets

SLIDE GUIDE DEVICE

The entire disclosure of Japanese Patent Application No. 2013-181461 filed Sep. 2, 2013 is expressly incorporated by reference herein.

BACKGROUND OF THE INVENTION

1. Field of the Invention

The present invention relates to a slide guide device. More specifically, it relates to a device used in a machine for measuring a minute displacement with a high accuracy, such as a surface roughness measuring machine and a roundness measuring machine.

2. Description of Related Art

Typical machines for measuring a minute displacement with a high accuracy (e.g. a surface roughness measuring machine and a roundness measuring machine) requires a highly accurate motion mechanism for moving an object to be measured or a measurement tool. Accordingly, a slide guide device suitable for improving the accuracy is used for such a motion mechanism.

A slide guide device can enhance the positioning accuracy of a slider on motion axis line, and face rigidity and vibration damping capability of a guide surface by employing a slide movement that accompanies a solid-contact (i.e. contact between solids). In order to enhance the positioning accuracy of a slider along the motion axis line of the slide guide device, it is preferable that a friction resistance on the slide surface is small and the slide movement is smooth. Accordingly, the slide guide device is often provided by an oil-lubricated slide guide device in which a pair of slide surfaces to be slid are not mutually solid-lubricated but are lubricated at an interface therebetween with the use of lubricating oil, thereby reducing the friction coefficient and, consequently, the friction resistance.

It should be noted that, when the thickness of an oil film between the relatively-moving slide surfaces is increased to eliminate the mutual solid-contact (i.e. fluid lubrication), the friction coefficient can be reduced toward zero. However, a face-to-face dimension between the pair of slide surfaces widens in accordance with an increase in the thickness of the oil film, so that an accuracy in the direction of the motion axis (i.e. a guide direction) is deteriorated in the fluid lubrication. Further, when the thickness of the oil film increases, the thickness is likely to be fluctuated due to the load applied, thereby lowering the rigidity as a guide. Accordingly, the fluid lubrication is not suitable for a guide device that requires higher rigidity and damping capability.

In order to provide a highly accurate slide guide device, in addition to the above-described deterioration in the positioning accuracy due to the friction resistance at the slide portion, the moment generated to the slide portion due to the friction resistance and accompanying change in the attitude (positional error) have been studied.

For instance, Patent Literature 1 (JP-B-61-17613) or Patent Literature 2 (JP-A-62-241629) discloses a slide guide device for moving a slider along a guide body, the slide guide device including a pair of slide surfaces respectively on front and back sides of the guide body and a pair of slide pads provided to the slider with the guide body interposed therebetween, the pair of slide pads being slid on the pair of slide surfaces. In order to move the slider, a drive unit such as a ball screw shaft is used.

In the above arrangement, it is known that, when a centroid of the slide is misaligned with a center of the drive force, a moment is generated to the slider during acceleration or deceleration of the slider.

Further, when the resultant force of the friction resistance between the pair of surfaces and the pair of slide pads of the slide guide device is misaligned with the center of the drive force, the moment is generated not only during the acceleration/deceleration of the slider but also during a movement at a constant speed.

When the slider causes a rotation being affected by the moment of the slider, unnecessary displacement occurs to a measurement piece and the like supported by the slider, so that a sufficiently high accuracy cannot be obtained even with the use of the highly accurate slide guide device.

In order to deal with the above problem, Patent Literature 1 employs a dynamic pressure slide system (i.e. boundary lubrication where the solid-contact is maintained while lubricating oil is supplied) for one of the pair of slide pads, and a static pressure system (a system receiving the pressure by oil film) for the other of the pair of slide pads, and the hydraulic pressure of the slide pad of the static pressure system is controlled to be balanced with a contact face pressure of the slide pad of the dynamic pressure system, thereby restraining the moment from being generated to the slider. Then, a guide surface on which the slide pad of the dynamic pressure system slides is defined as a reference guide surface to ensure a guidance accuracy to avoid an influence of fluctuation of the thickness of the oil film between the slide pad of the static pressure system and the corresponding guide surface.

Further, in Patent Literature 2, one of the pair of slide pads is provided by the dynamic pressure system and the other of the pair of slide pads is provided by the static pressure system, and the pair of slide pads are provided at both ends in the movement direction of the slider, so that a compensation operation of the slide pads for the change in the attitude of the slider by control of the slide pad of the static pressure system can effectively work.

The slide guide devices according to the above-described Patent Literatures 1 and 2 employ the dynamic pressure system and the static pressure system for the pair of slide pads, so that the moment can be restrained from being generated to the slider due to the friction resistance of the slide pads.

However, in the slide guide devices according to Patent Literatures 1 and 2, the hydraulic pressure supplied to the slide pad of the static pressure system has to be intricately adjusted and maintained in accordance with a contact face pressure of the slide pad of the dynamic pressure system, and a complicated pipe system is also required. In addition, since a distance to a guide surface is measured for feedback control in order to keep the attitude of the slider in Patent Literature 2, the control system becomes necessarily complicated.

As described above, the moment is inevitably caused on the slider of the typical slide guide devices due to the friction resistance, thereby possibly lowering the accuracy. On the other hand, in order to provide a solution for the above deficiencies, the arrangement of the device necessarily becomes complicated.

SUMMARY OF THE INVENTION

An object of the invention is to provide a slide guide device that is capable of avoiding accuracy deterioration related to a friction resistance and is simple in structure so that the manufacture and adjustment can be facilitated.

A slide guide device according to an aspect of the invention includes: a guide body including a reference guide surface and a sub guide surface that are parallel to each other; a slider including a reference slide pad configured to slide on the reference guide surface and a sub slide pad configured to slide on the sub guide surface, the slider being configured to be driven by a drive unit to move along the guide body, in which the sub slide pad includes: a sub slide surface that is configured to slide on the sub guide surface; and an auxiliary pressure-receiving surface that is configured to receive a load from the sub guide surface in a manner non-contact with the sub guide surface.

In the above aspect of the invention, the auxiliary pressure-receiving surface may be arranged in any manner as long as the auxiliary pressure-receiving surface is capable of sharing with the sub slide surface the load between the sub slide pad and the sub guide surface and provides no slide resistance in the guidance direction (i.e. the movement direction of the slider relative to the guide body). For instance, a structure capable of receiving without a solid-contact such as a structure holding a fluid (gas or liquid) between the sub slide surface and the sub guide surface and receiving the pressure by a pressure of the fluid, and a structure capable of receiving the pressure in a non-contact manner by a repulsive force of magnets may be used.

In the above aspect of the invention, the slider is driven by the drive unit while being guided by the guide body. The guidance of the slider by the guide body is effected by the reference slide pad sliding on the reference guide surface and the sub slide pad sliding on the sub guide surface.

At this time, when the conditions (e.g. the material) of the reference guide surface, the sub guide surface, the reference slide pad and the sub slide pad are the same, the reference slide pad and the sub slide pad that are mutually oppositely disposed in a pair would produce the contact forces of the same size, thereby causing the friction resistances of the same size in accordance with the movement of the slider relative to the guide body.

In the sub slide pad, a part of the contact force is shared by the auxiliary pressure-receiving surface, so that the contact force received by the sub slide surface becomes smaller than the contact force applied on the reference slide pad. As a result, the resultant force of the friction resistance at the reference slide pad and the friction resistance at the sub slide pad can be displaced toward the reference slide pad.

If the center of the drive force applied by the drive unit is shifted toward the reference guide surface relative to the center of the guide body, the resultant force of the friction resistances of the reference slide pad and the sub slide pad can be displaced toward the reference slide pad by sharing a part of the contact force by the auxiliary pressure-receiving surface as described above. Accordingly, by adjusting the share ratio by the auxiliary pressure-receiving surface, the resultant force of the friction resistances of the reference slide pad and the sub slide pad can be brought close to, or aligned with the center of the drive force. As a result, the moment caused due to the friction resistance and consequent deterioration in the accuracy can be avoided.

The share ratio by the auxiliary pressure-receiving surface in the sub slide pad can be structurally adjusted during a design process, so that it is not necessary to perform a complicated feedback control and the like each time the device is operated.

As described above, the invention is capable of preventing the moment from generating and capable of avoiding accuracy deterioration related to the friction resistance, and the structure can be simplified and the manufacture and adjustment can be facilitated.

In the above arrangement, it is preferable that the slide guide device further include a preload mechanism that is configured to apply a preload between the reference guide surface and the reference slide pad, in which formula of $N'/N=a/b$ is satisfied, where: a denotes a distance between a drive axis of the drive unit and the reference guide surface; b denotes a distance between the drive axis and the sub guide surface; N denotes a contact force between the reference guide surface and the reference slide pad; and N' denotes a contact force between the sub guide surface and the sub slide surface.

According to the above arrangement, the contact force shared to be received by the auxiliary pressure-receiving surface and the sub slide surface is set according to the predetermined formula, so that the resultant force of the friction resistances by the reference slide pad and the sub slide pad can be aligned with the center of the drive force, so that the generation of the moment can be avoided.

It should be noted that, even when the above formula is not fully met, a reasonably proper balance can be ensured as long as a similar value is obtained, so that the performance of the slide guide device can be expected to be improved.

In the above arrangement, it is preferable that the sub slide surface is provided in an annular shape surrounding the auxiliary pressure-receiving surface, and an air pocket to which a compressed air is supplied from an outside is formed on the auxiliary pressure-receiving surface.

According to the above arrangement, since the air pocket is used as the auxiliary pressure-receiving surface, the structure of the auxiliary pressure-receiving surface can be simplified. Further, since an outflow component of the compressed air can be released to the atmosphere, only a minimum number of additional equipment is required. Further, the annular sub slide surface surrounding the auxiliary pressure-receiving surface can also serve as the peripheral edge of the air pocket, thereby further simplifying the structure.

It should be noted that it is not necessary to surround the auxiliary pressure-receiving surface with the annular sub slide surface but, for instance, the section of the air pocket and the section of the sub slide surface may be juxtaposed. Further, it is not necessary for the auxiliary pressure-receiving surface to use pneumatic pressure such as the air pocket, but the auxiliary pressure-receiving surface may alternatively be those using fluid pressure such as a liquid pocket to which pressurizing hydraulic oil is supplied.

In the above arrangement, it is preferable that an opening area S of the air pocket is set according to a formula of $S=N[1-(a/b)]/Ps$, where: a denotes a distance between a drive axis of the drive unit and the reference guide surface; b denotes a distance between the drive axis and the sub guide surface; N denotes a contact force between the reference guide surface and the reference slide pad; and Ps denotes a pressure of the compressed air.

According to the above arrangement using the air pocket, when the opening area of the air pocket is set according to the predetermined formula, the share ratio of the contact force by the auxiliary pressure-receiving surface can be appropriately adjusted, so that the resultant force of the friction resistances by the reference slide pad and the sub slide pad can be aligned with the center of the drive force, so that the generation of the moment can be avoided.

It should be noted that, even when the above formula is not fully met, a reasonably proper balance can be ensured as long as a similar value is obtained, so that the performance of the slide guide device can be expected to be improved.

In the above arrangement, it is preferable that the sub slide pad is supported by the slider in an advanceable and retractable manner in a direction orthogonal to the sub slide surface, a preload chamber is defined between a side of the sub slide pad opposite the sub slide surface and the slider, and the compressed air is supplied through the preload chamber to the air pocket.

In general, in order to apply a preload for providing the contact force between the reference slide pad and the reference slide surface and between the sub slide pad and the sub slide surface in a slide guide device, the reference slide pad is supported in a floating manner and a resilient member such as a coil spring is disposed on a backside (i.e. a side opposite the sub slide surface) of the reference slide pad to bias the reference slide pad toward the sub slide surface.

In the above arrangement, the above-described preload can be applied by the preload chamber in place of the resilient member. In this arrangement, since the preload applied by the preload chamber is based on the pressure of the compressed air supplied to the air pocket, even when the pressure Ps of the compressed air is fluctuated, the preload can automatically follow the fluctuation.

Accordingly, it is not necessary to adjust the preload irrespective of the fluctuation in the pressure Ps of the compressed air, so that an adjustment at the time of manufacture or operation can be simplified.

In the above arrangement, an opening area S of the air pocket is set according to a formula of $S=So\cdot[1-(a/b)]$, where: a represents a distance between a drive axis of the drive unit and the reference guide surface; b represents a distance between the drive axis and the sub guide surface; and So represents a pressure-receiving area of the sub slide pad facing the preload chamber.

According to the above arrangement using the air pocket and the preload chamber, when the relationship between the opening area of the air pocket and the pressure-receiving area of the preload chamber is set according to the predetermined formula, the share ratio of the contact force by the auxiliary pressure-receiving surface can be appropriately adjusted, so that the resultant force of the friction resistances by the reference slide pad and the sub slide pad can be aligned with the center of the drive force, so that the generation of the moment can be avoided.

It should be noted that, even when the above formula is not fully met, a reasonably proper balance can be ensured as long as a similar value is obtained, so that the performance of the slide guide device can be expected to be improved.

According to the invention, the balance between the friction resistance of the reference slide pad and the friction resistance of the sub slide pad can be adjusted to align (or bring close) the resultant force of the friction resistances with the center of the drive force, thereby avoiding the moment caused due to the friction resistance. Accordingly, the accuracy deterioration related to the friction resistance can be avoided, so that the structure can be simplified and the manufacture and adjustment can be facilitated.

DESCRIPTION OF EMBODIMENT(S)

First Exemplary Embodiment

A first exemplary embodiment of the invention will be described below with reference to FIGS. 1 to 7.

Figure 1:
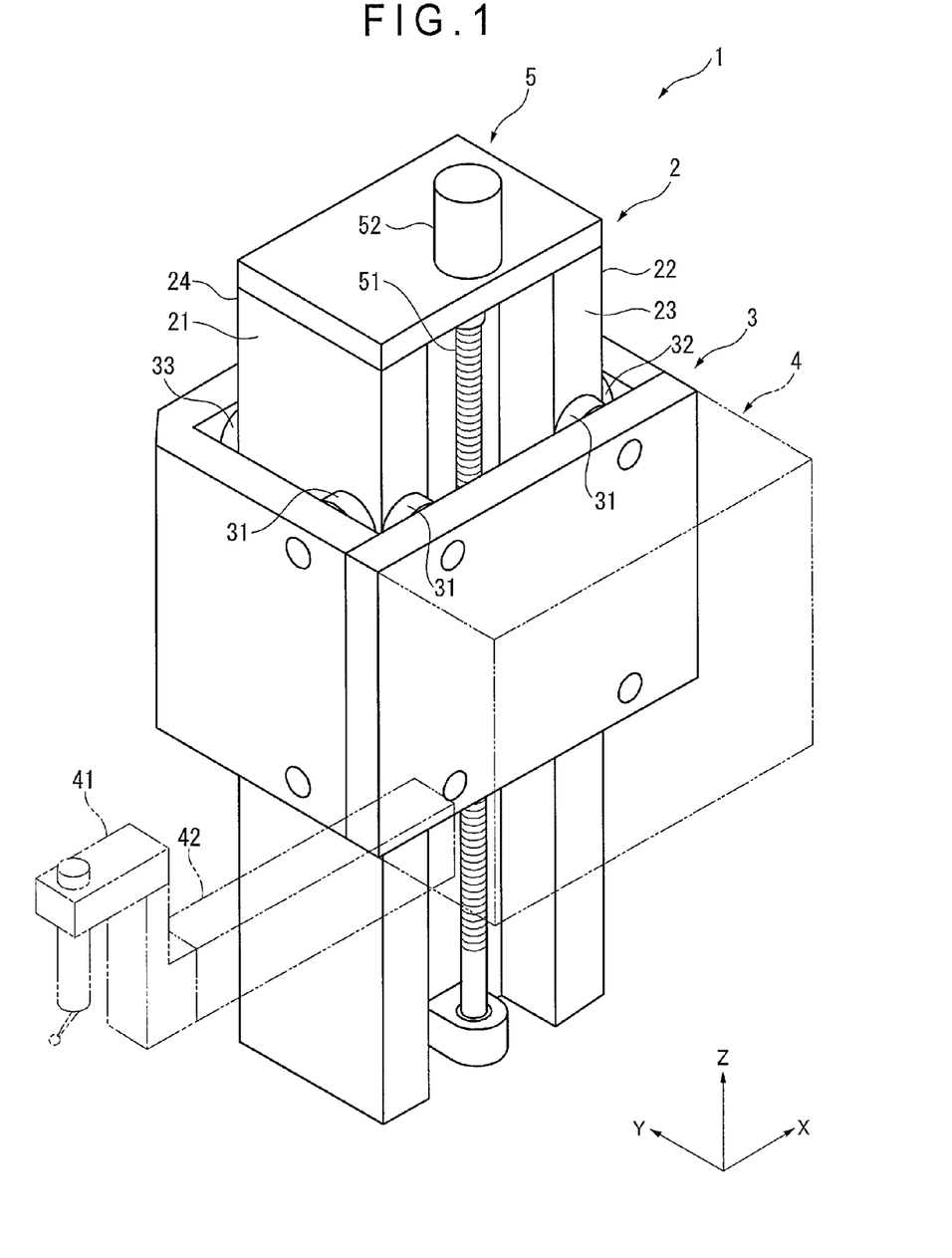
FIG. 1 is a perspective view showing a slide guide device according to a first exemplary embodiment of the invention.
Figure 2:
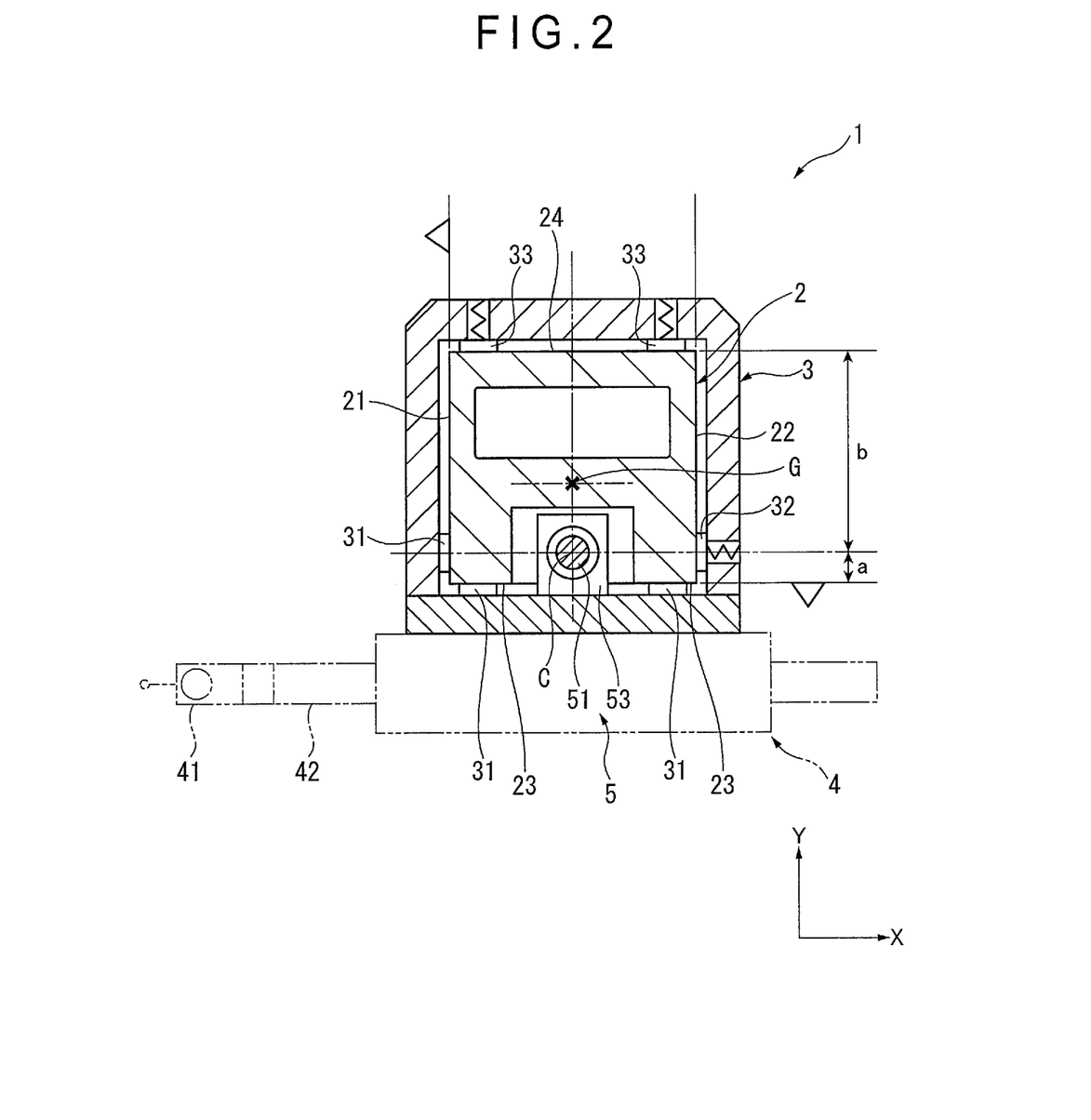
FIG. 2 is a top cross sectional view showing the slide guide device according to the first exemplary embodiment.
Figure 3:
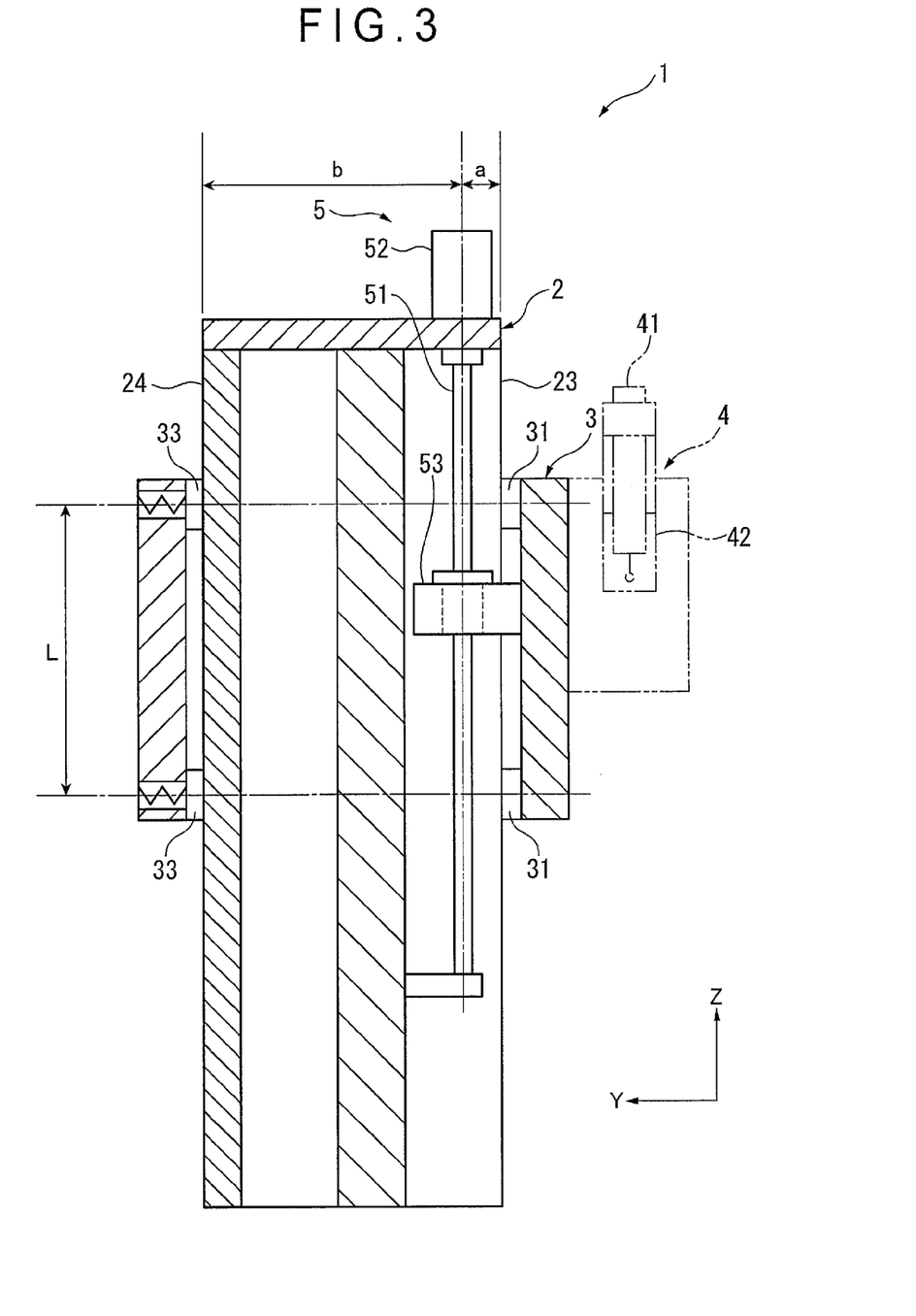
FIG. 3 is a vertical cross sectional view showing the slide guide device according to the first exemplary embodiment.

A slide guide device 1 according to the first exemplary embodiment shown in FIGS. 1 to 3 is a component of a highly accurate three-axis motion mechanism used for highly accurately guiding an object while maintaining positions in X-axis direction and Y-axis direction during a movement in a Z-axis direction in, for instance, a surface profile measuring machine and a coordinate measuring machine.

The slide guide device 1 accordingly includes a vertical column-shaped guide body 2 extending in the Z-axis direction and a slider 3 that is adapted to move along the guide body 2.

An X-axis motion mechanism 4 is attached to the slider 3. A measurement tool 41 such as a contact probe is held at an end of the slider 3.

The measurement tool 41 is moved in the X-axis direction by advancing and retracting an arm 42 by the X-axis motion mechanism 4. Further, the measurement tool 41 is moved in the Z-axis direction in accordance with the movement of the slider 3 along the guide body 2 of the slide guide device 1.

It should be noted that the movement in the Y-axis direction is effected by a movement in the Y-axis direction of a table on which a workpiece to be measured by the measurement tool 41 is placed, or a Y-axis motion mechanism for moving the guide body 2, either of which is not shown.

A drive unit 5 for moving the slider 3 along the guide body 2 is provided to the guide body 2.

The drive unit 5 includes a feed screw 51 disposed along the guide body 2, and a motor 52 provided to an upper end of the guide body 2 for rotating the feed screw 51.

As shown in FIGS. 2 and 3, a nut 53 is fixed to the slider 3. The feed screw 51 is screwed into the nut 53.

As mentioned above, the slide guide device 1 guides the slider 3 while maintaining positions in the X-axis direction and Y-axis direction during a movement in the Z-axis direction.

Accordingly, a slide mechanism for highly accurately guiding in the X-axis direction and Y-axis direction is provided between the guide body 2 and the slider 3.

The guide body 2 has a pair of side surfaces orthogonal to with the X-axis direction. One of the pair of side surfaces that faces a minus-coordinate side in the X-axis direction is defined as an X-axis reference guide surface 21, while the other one of the pair of side surfaces that faces a plus-coordinate side in the X-axis direction is defined as an X-axis sub guide surface 22. These X-axis reference guide surface 21 and the X-axis sub guide surface 22 each are parallel to the Z-axis and Y-axis.

The guide body 2 also has a pair of side surfaces orthogonal to with the Y-axis direction. One of the pair of side surfaces that faces a minus-coordinate side (i.e. a side on which the X-axis motion mechanism 4 is provided) in the Y-axis direction is defined as a Y-axis reference guide surface 23, while the other one of the pair of side surfaces that faces a plus-coordinate side in the Y-axis direction is defined as a Y-axis sub guide surface 24. These Y-axis reference guide surface 23 and the Y-axis sub guide surface 24 are each parallel to the Z-axis and X-axis.

Reference slide pads 31 slidably movable on the X-axis reference guide surface 21 and the Y-axis reference guide surface 23 and sub slide pads 32, 33 slidably movable on the X-axis sub guide surface 22 and the Y-axis sub guide surface 24 are provided to the slider 3. It should be noted that, though the reference pads 31, 32, 33 are provided in plural (two or four: see FIGS. 1 to 3) to respective sides of the slider 3, the number of the pads may be determined as desired, where there may be a single pad or more than two pads for each of the sides of the slider 3.

Figure 4:
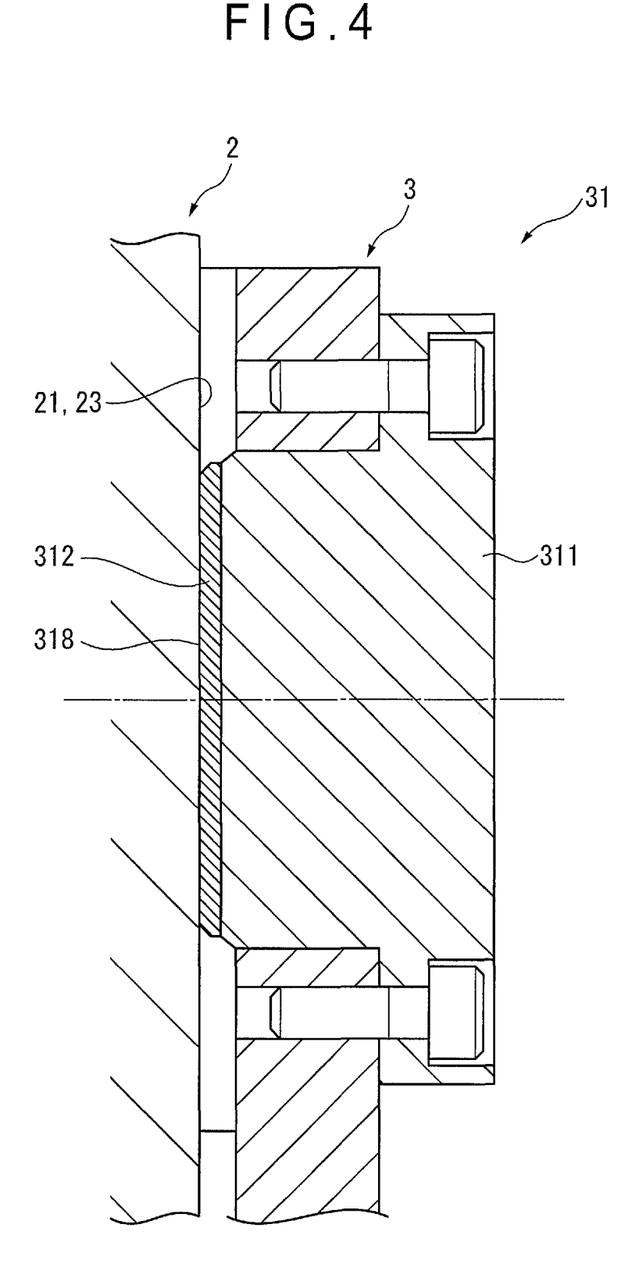
FIG. 4 is an enlarged vertical cross sectional view showing a reference guide surface and a reference slide pad according to the first exemplary embodiment.

As shown in FIG. 4, each of the reference slide pads 31 includes a plug pad 311 bolted to the slider 3 from an outside of an opening hole of the slider 3. The plug pad 311 is disposed with a surface thereof being exposed on an inner surface of the slider 3.

A slide plate 312 is attached to the surface of the plug pad 311.

The slide plate 312 is exemplarily provided by a fluorine resin sheet such as PTFE (polytetrafluoroethylene resin) of approximately 1 mm thick.

At least one of the reference slide pads 31 facing the X-axis reference guide surface 21 is slidably movable on the X-axis reference guide surface 21 with the surface (slide surface 318) of the slide plate 312. Further, as shown in FIGS. 2 and 3, the guide body 2 is held in the X-axis direction between the at least one of the reference slide pads 31 slidably movable on the X-axis reference guide surface 21 and the sub slide pad(s) 32 slidably movable on the X-axis sub guide surface 22, thereby aligning the position of the slider 3 in the X-axis direction relative to the guide body 2 with the X-axis reference guide surface 21.

At least one of the reference slide pads 31 facing the Y-axis reference guide surface 23 is slidably movable on the Y-axis reference guide surface 23 with the surface (slide surface 318) of the slide plate 312. Further, as shown in FIGS. 2 and 3, the guide body 2 is held in the Y-axis direction between the at least one of the reference slide pads 31 slidably movable on the Y-axis reference guide surface 23 and the sub slide pad(s) 33 slidably movable on the Y-axis sub guide surface 24, thereby aligning the position of the slider 3 in the Y-axis direction relative to the guide body 2 with the Y-axis reference guide surface 23.

Figure 5:
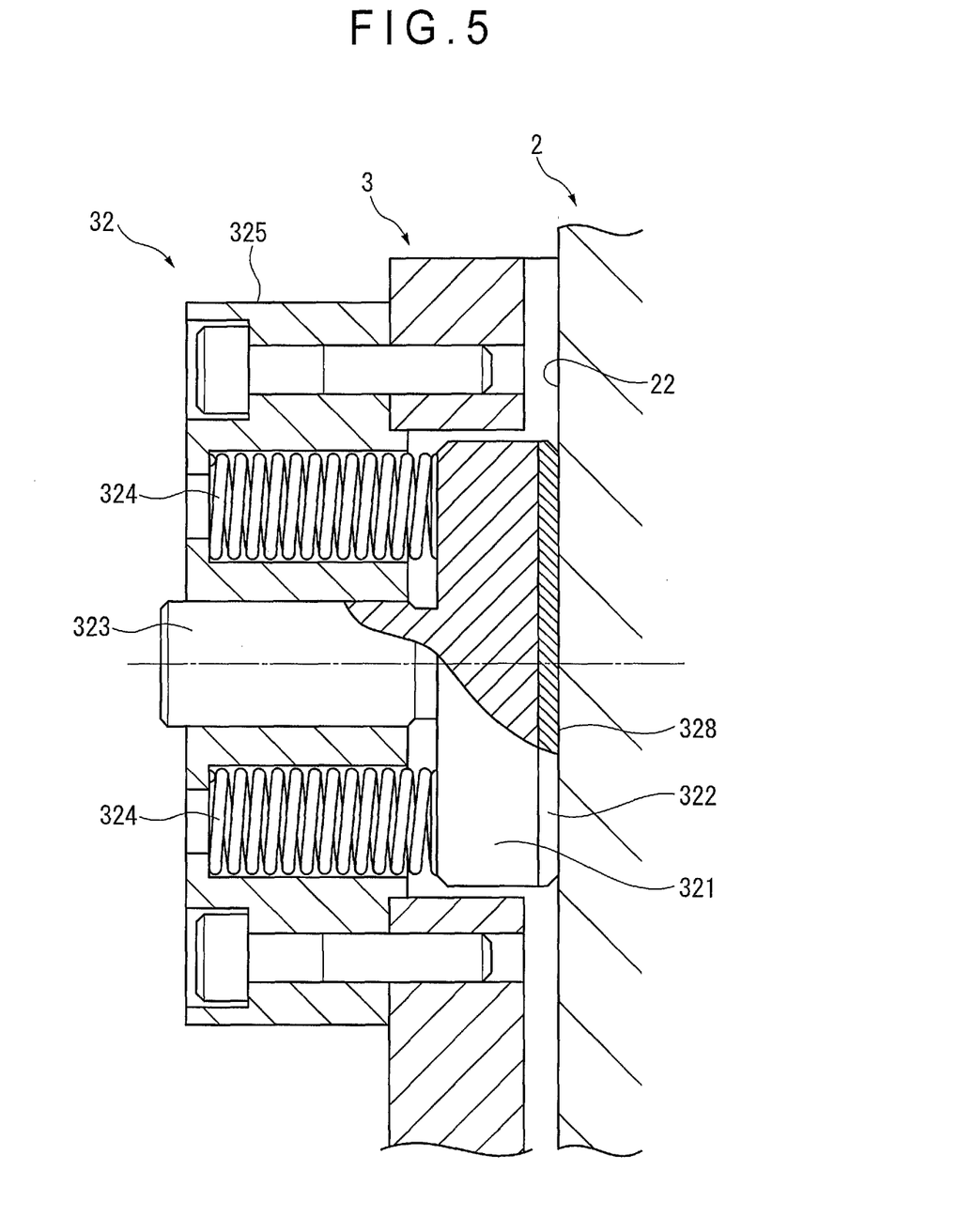
FIG. 5 is an enlarged vertical cross sectional view showing a sub guide surface and a sub slide pad in an X-axis direction according to the first exemplary embodiment.

As shown in FIG. 5, the sub slide pad(s) 32 includes a disc-shaped disc pad 321. The disc pad 321 is supported by a guide block 325 through a guide rod 323 fixed to a backside of the disc pad 321.

The guide block 325 is bolted to the slider 3 from an outside of the opening hole of the slider 3. The guide block 325 is disposed with a surface of the disc pad 321 being exposed on the inner surface of the slider 3.

A slide plate 322 is attached to the surface of the disc pad 321.

The slide plate 322 is provided by a sheet of the same material and dimension as those for the above-described slide plate 312.

The sub slide pad 32 is provided with a preload unit for pressing the slide plate 322 on the surface of the disc pad 321 toward the X-axis sub guide surface 22 with a predetermined contact force.

The preload unit of the sub slide pad 32 is provided in a form of a plurality of preload springs 324 to the guide block 325 around the guide rod 323. The preload springs 324 press a backside of the disc pad 321, so that the surface (slide surface 328) of the slide plate 322 on the front side is pressed against the X-axis sub guide surface 22 with the predetermined contact force.

As shown in FIG. 2, when the sub slide pad 32 is pressed against the X-axis sub guide surface 22 with the predetermined contact force, the same contact force is generated as a reaction force between the X-axis reference guide surface 21 and the reference slide pad 31 slidably movable on the X-axis reference guide surface 21, thereby effecting the preloading in the X-axis direction.

Figure 6:
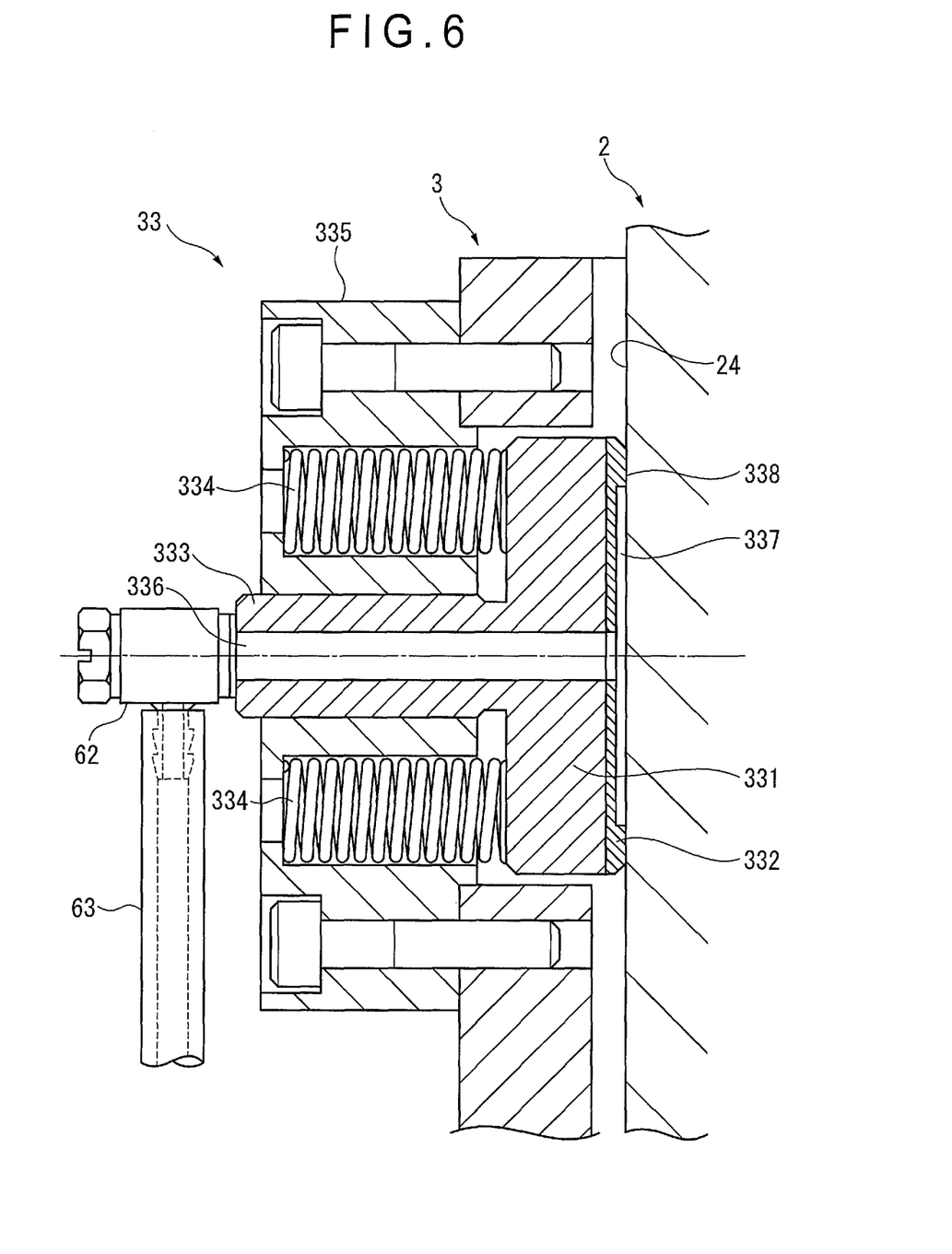
FIG. 6 is an enlarged vertical cross sectional view showing the sub guide surface and the sub slide pad in a Y-axis direction according to the first exemplary embodiment.

As shown in FIG. 6, the sub slide pad(s) 33 includes a disc-shaped disc pad 331. The disc pad 331 is supported by a guide block 335 through a guide rod 333 fixed to a backside of the disc pad 331.

The guide block 335 is bolted to the slider 3 from an outside of the opening hole of the slider 3. The guide block 335 is disposed with a surface of the disc pad 331 being exposed on the inner surface of the slider 3.

A slide plate 332 is attached to the surface of the disc pad 331. The slide plate 332 is provided by a sheet of the same material and dimension as those for the above-described slide plate 312.

Figure 7:
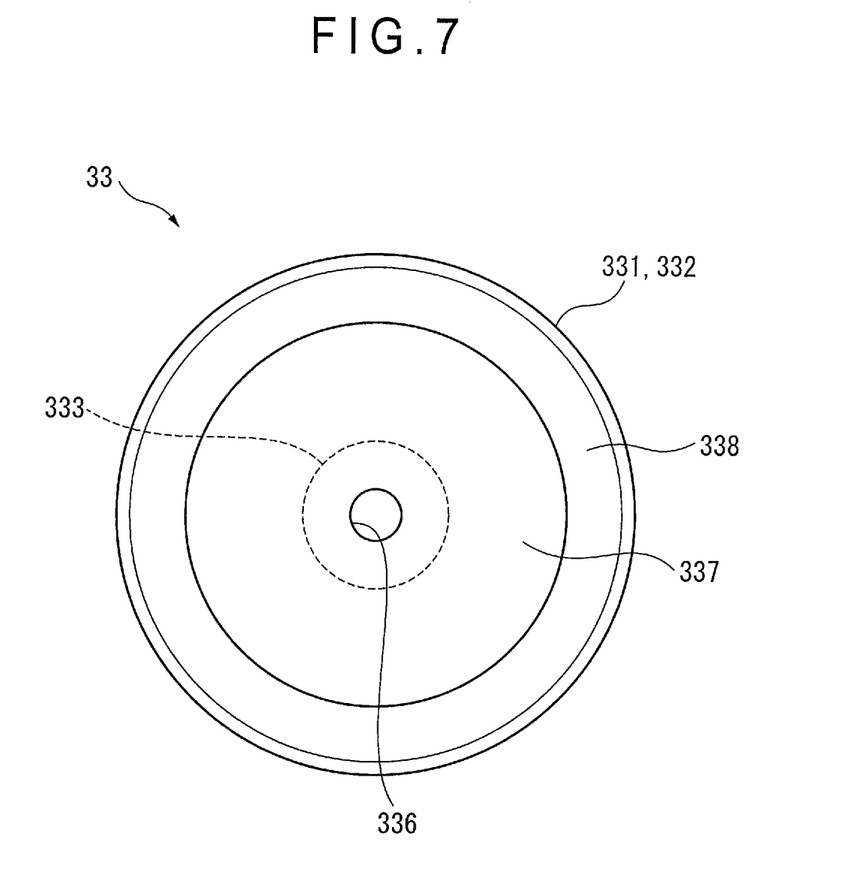
FIG. 7 is an enlarged front elevational view showing a sub slide surface and an air pocket according to the first exemplary embodiment.

As shown in FIG. 7, a surface of the slide plate 332 is concentrically divided into an outer section and an inner section. An annular slide surface 338 is formed in the outer section while a thin recessed air pocket 337 is formed in the inner section.

In the first exemplary embodiment, the slide surface 338 defines a sub slide surface of the invention, which slides solely on the Y-axis sub guide surface 24. The air pocket 337 defines an auxiliary pressure-receiving surface of the invention, which receives a shared portion of a load from the Y-axis sub guide surface 24 in a manner non-contact with the Y-axis sub guide surface 24.

Referring back to FIG. 6, the air pocket 337 forms a static-pressure air bearing with the opposing Y-axis sub guide surface 24 by a compressed air supplied from an external compressed-air source (e.g. a compressor and an accumulator: not shown), thereby sharing the load in a non-contact manner.

Accordingly, an air passage 336 penetrating through a center axis of the guide rod 333 is provided.

An end of the air passage 336 opposite to the air pocket 337 is open to an end surface of the guide rod 333. An air tube 63 from the above-described not-illustrated compressed-air source is connected to the opening through a pipe joint 62, thereby supplying the compressed air into the air passage 336.

The other end of the air passage 336 is open to be in communication with the air pocket 337.

The sub slide pad 33 is provided with a preload unit for pressing the slide plate 332 on the surface of the disc pad 331 toward the Y-axis sub guide surface 24 with the predetermined contact force.

A preload spring 334 similar to the preload spring 324 of the sub slide pad 32 is used for the preload unit for the sub slide pad 33.

Specifically, the guide block 335 is provided with a plurality of preload springs 334 around the guide rod 333. The preload springs 334 press a backside of the disc pad 331, so that the surface (slide surface 338) of the slide plate 332 on the front side is pressed against the Y-axis sub guide surface 24 with the predetermined contact force.

As shown in FIGS. 2 and 3, when the sub slide pad 33 is pressed against the Y-axis sub guide surface 24 with the predetermined contact force, the same contact force is generated as a reaction force between the Y-axis reference guide surface 23 and each of the reference slide pads 31 slidably movable on the Y-axis reference guide surface 23, thereby effecting the preloading in the Y-axis direction.

In the first exemplary embodiment, the above-described reference slide pads 31 and the X-axis and Y-axis sub slide pads 32, 33 respectively hold the guide body 2 in the X-axis direction and the Y-axis direction, thereby accurately guiding the slider 3 in the Z-axis direction along the guide body 2.

In the above, the feed screw 51 of the drive unit 5 is disposed at the center of the guide body 2 in the X-axis direction and the reference slide pad 31 and the sub slide pad 32 are disposed symmetrically relative to a center C of the drive axis of the drive unit 5 (i.e. the feed screw 51) in the X-axis direction, as shown in FIG. 2.

Accordingly, even when the slider 3 is moved by the drive unit 5, a resultant force of the friction resistance caused by the reference slide pad 31 and the friction resistance caused by the sub slide pad 32 aligns with the center C, so that the moment due to the friction resistance caused by the reference slide pad 31 and the friction resistance caused by the sub slide pad 32 is not generated to the slider 3.

In contrast, with reference to the Y-axis direction, as shown in FIG. 2, the feed screw 51 of the drive unit 5 is located close to the Y-axis reference guide surface 23 and far from the Y-axis sub guide surface 24 on a plus-coordinate side in the Y-axis direction. However, since the reference slide pads 31 and the sub slide pads 33 respectively slide on the Y-axis reference guide surface 23 and the Y-axis sub guide surface 24, a center G of a resultant force of the friction resistances caused to the slide pads when the slider 3 is moved is at the center of the guide body 2 and does not align with the center C of the feed screw 51. In this condition, the moment caused by the friction resistances by the reference slide pads 31 and the sub slide pads 33 is generated to the slider 3.

However, in the first exemplary embodiment, since the load applied to each of the sub slide pads 33 from the Y-axis sub guide surface 24 is shared to be received by the outer slide surface 338 and the inner air pocket 337, the center G of the resultant force of the friction resistances by the reference slide pads 31 and the sub slide pads 33 can be aligned with the center C of the feed screw 51 (drive axis).

In order to achieve the sharing of the load, the air pocket 337 of the each of the sub slide pads 33 is defined so that an opening area S of the air pocket 337 satisfies a relationship of $S=N[1-(a/b)]/Ps$, where: a denotes a distance between the center C of the feed screw 51 and the Y-axis reference guide surface 23; b denotes a distance from the center C of the feed screw 51 and the Y-axis sub guide surface; N denotes a contact force applied between the Y-axis reference guide surface 23 and each of the reference slide pads 31; and Ps denotes a pressure of the compressed air supplied from an external source to the air pocket 337.

The basis of the above setting is as follows.

Supposing that the contact force is N and the friction coefficient is $\mu$ between the Y-axis reference guide surface 23 and each of the reference slide pads 31, a friction resistance F in accordance with the movement of the slider 3 is defined by $F=\mu N$.

Since the same slide plate 332 is used, the friction coefficient $\mu$ is the same as that between the Y-axis reference guide surface 23 and each of the reference slide pads 31. However, since the contact force N (normal force) becomes N' as a result of being shared to be received by the air pocket 337 and the slide surface 338, the friction resistance in accordance with the movement of the slide 3 is defined by $F'=\mu N'$ between the Y-axis sub guide surface 24 and each of the sub slide pads 33.

In order to align the center G of the resultant force of the friction resistances F, F' with the center C of the feed screw 51, it is necessary that the ratio between the friction resistances becomes $F'/F=a/b$, and, consequently, it is necessary that the ratio of the load received by the slide surface 338 relative to the load received by the entirety of the sub slide pad 33 becomes $N'/N=a/b$.

In this arrangement, though no friction resistance is generated at the air pocket 337, the air pocket 337 shares a portion (N−N') of the contact force N applied to the entirety of the sub slide pad 33 subtracting the load N' received by the slide surface 338. The shared load is a function of a product (Ps·S) of the pressure Ps of the compressed air supplied to the air pocket 337 and the opening area S of the air pocket 337.

Accordingly, a formula $N-N'=Ps \cdot S$ is established, which can be modified as $S=N-N'/Ps=N[1-(a/b)]/Ps$.

In other words, in order to align the center G of the resultant force of the friction resistances F, F' with the center C of the feed screw 51, it is only necessary that the opening area S of the air pocket 337 is defined in view of the position (a, b) of the feed screw 51 and the pressure Ps of the supplied compressed air.

Incidentally, in an actual use, the air pocket 337 is designed supposing that the pressure Ps is the nominal value or the standard value of the supply pressure of the supply source of the compressed air, and, when the sub slide pad 33 manufactured to have the air pocket 337 of the opening area S is actually used, the supply pressure of the compressed air source is appropriately adjusted so that the supply pressure becomes the pressure Ps referenced in designing the sub slide pad 33. With the above adjustment, the above-described ratio of the load applied to the slide surface 338 of the sub slide pad 33 becomes $N'/N=a/b$, whereby the moment in the Y-axis direction is kept from occurring in the slider 3.

Effect(s) of First Exemplary Embodiment

The above-described first exemplary embodiment provides the following effects.

According to the first exemplary embodiment, the slider 3 is driven by the drive unit 5 to be guided in the Z-axis direction along the guide body 2. The guidance of the slider 3 by the guide body 2 is effected by the reference slide pads 31 sliding on the X-axis reference guide surface 21 and the Y-axis reference guide surface 23 and the sub slide pads 32, 33 sliding on the X-axis sub guide surface 22 and the Y-axis sub guide surface 24.

The guide body 2 extends in the Z-axis direction (i.e. vertical direction). Since the guide body 2 is held in the X-axis direction by the reference slide pads 31 slidable on the X-axis reference guide surface 21 and the sub slide pad 32 slidable on the X-axis sub guide surface 22 and is held in the Y-axis direction by the reference slide pads 31 slidable on the Y-axis reference guide surface 23 and the sub slide pads 33 slidable on the Y-axis sub guide surface 24, the slider 3 is kept from being detached from the guide body 2.

Further, irrespective of the position in the Z-axis direction, the positioning accuracy in the X-axis direction can be ensured by the X-axis reference guide surface 21 and one of the reference slide pads 31 slidable on the X-axis reference guide surface 21. Also, irrespective of the position in the Z-axis direction, the positioning accuracy in the Y-axis direction can be ensured by the Y-axis reference guide surface 23 and the reference slide pads 31 slidable on the Y-axis reference guide surface 23.

In the first exemplary embodiment, the feed screw 51 of the drive unit 5 is disposed in the middle of the guide body 2 in the X-axis direction. Accordingly, the drive force is aligned with the resultant force of the friction resistances of the reference slide pad 31 and the sub slide pad 32 opposing in the X-axis direction, so that the moment is not generated to the slider 3 when the slider 3 is moved.

In contrast, the feed screw 51 is disposed close to the Y-axis reference guide surface 23 of the guide body 2 in the Y-axis direction. Accordingly, the drive force does not align with the resultant force of the friction resistances of the reference slide pads 31 and the sub slide pads 33 opposing in the Y-axis direction, so that the moment is generated to the slider 3 when the slider 3 is moved, if the misalignment is not adjusted.

However, in the first exemplary embodiment, since the balance of the friction resistance is adjusted by the sub slide pads 33, the resultant force of the friction resistances caused by the reference slide pads 31 and the sub slide pads 33 opposing in the Y-axis direction is displaced to be aligned with the drive force of the feed screw 51.

In each of the sub slide pads 33, a part of the contact force N is shared to be received by the air pocket 337 (auxiliary pressure-receiving surface), so that the contact force N' received by the slide surface 338 (sub slide surface) becomes smaller than the contact force N applied on the reference slide pad 31. As a result, the resultant force of the friction resistance $F=\mu N$ at the reference slide pads 31 and the friction resistance $F'=\mu N'$ at the sub slide pads 33 can be displaced toward the reference slide pad.

Specifically, supposing that: the distance between the feed screw 51 (drive axis of the drive unit 5) and the Y-axis reference guide surface 23 is a; the distance between the feed screw 51 and the Y-axis sub guide surface 24 is b; the pressure of the compressed air supplied to the air pocket 337 is Ps; and the opening area of the air pocket 337 is S, the relationship of $S=N[1-(a/b)]/Ps$ is established.

Accordingly, in each of the sub slide pads 33, the contact force on the slide surface 338 becomes N' and the normal force shared to be received by the air pocket 337 becomes $Ps \cdot S=N[1-(a/b)]$. Since the contact force of the entirety of the sub slide pad 33 is N, $N=N'+Ps \cdot S$ and consequently $N'=N(a/b)$. In other words, the relationship of $N'/N=a/b$ is established.

Accordingly, in the present exemplary embodiment, the contact force N is shared to be received by the air pocket 337 (auxiliary pressure-receiving surface) and the slide surface 338 (sub slide surface) so that the resultant force of the friction resistances by the reference slide pads 31 and the sub slide pad 33 can be aligned with the center of the drive force, thereby avoiding the generation of the moment.

It should be noted that, even when the above formula is not fully met, a reasonably proper balance can be ensured as long as a similar value is obtained, so that the performance of the slide guide device can be expected to be improved.

As described above, according to the first exemplary embodiment, the moment due to the friction resistance caused to the slider 3 moving along the guide body 2 can be eliminated or restrained. Accordingly, the accuracy deterioration related to the friction resistance can be avoided, so that the structure can be simplified and the manufacture and adjustment can be facilitated.

Further, the share ratio of the contact force in the sub slide pads 33 can be structurally adjusted during a design process, so that it is not necessary to perform a complicated feedback control and the like each time the device is operated.

Especially, in the first exemplary embodiment, since the opening area S of the air pocket 337 is defined as $S=N[1-(a/b)]/Ps$ based on the pressure Ps of the compressed air, the share ratio of the contact force by the auxiliary pressure-receiving surface can be appropriately adjusted.

In the first exemplary embodiment, since the air pocket 337 to which the compressed air is supplied is used as the auxiliary pressure-receiving surface, the auxiliary pressure-receiving surface causing no friction resistance can be provided in a simple structure. Further, since an outflow component of the compressed air can be released to the atmosphere, only a minimum number of additional equipment is required.

Further, since the annular slide surface 338 (sub slide surface) is provided to surround the air pocket 337, the slide surface 338 can also serve as a peripheral edge of the air pocket, so that the structure can be further simplified.

Second Exemplary Embodiment

A second exemplary embodiment of the invention will be described below with reference to FIGS. 8 to 10.

In the second exemplary embodiment, in place of the sub slide pad 33 (see FIG. 6) in the Y-axis direction of the slide guide device 1 according to the above-described first exemplary embodiment, a sub slide pad 34 (see FIG. 8) of a different structure is employed. Accordingly, the same components as those in the above-described first exemplary embodiment will be denoted by the same reference numeral to omit duplicated explanation. In the following, the different component, i.e. the sub slide pad 34 will be described.

While the sub slide pad 33 (see FIG. 6) in the above-described first exemplary embodiment uses the preload springs 334 as the preload unit, the sub slide pad 34 (see FIG. 8) of the second exemplary embodiment uses a preload chamber 344 in which the compressed air flows.

Figure 8:
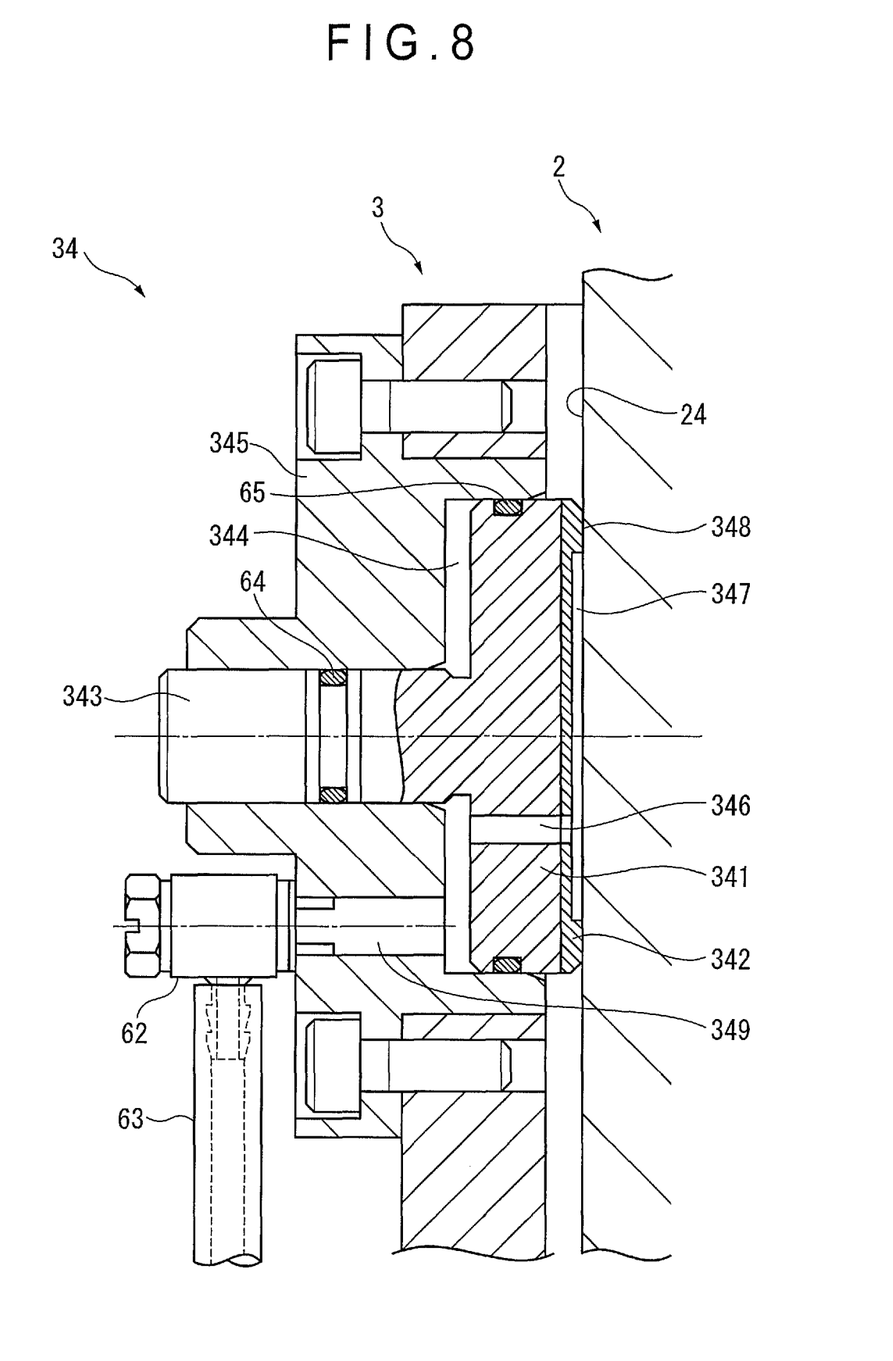
FIG. 8 is an enlarged vertical cross sectional view showing a sub guide surface and a sub slide pad according to a second exemplary embodiment of the invention.

As shown in FIG. 8, the sub slide pad(s) 34 includes a disc-shaped disc pad 341. The disc pad 341 is supported by a guide block 345 through a guide rod 343 fixed to a backside of the disc pad 341.

The guide block 345 is bolted to the slider 3 from an outside of the opening hole of the slider 3. The guide block 345 is disposed with a surface of the disc pad 341 being exposed on the inner surface of the slider 3.

A slide plate 342 is attached to the surface of the disc pad 341.

The slide plate 342 is provided by a sheet of the same material and dimension as those for the above-described slide plate 312.

Figure 9:
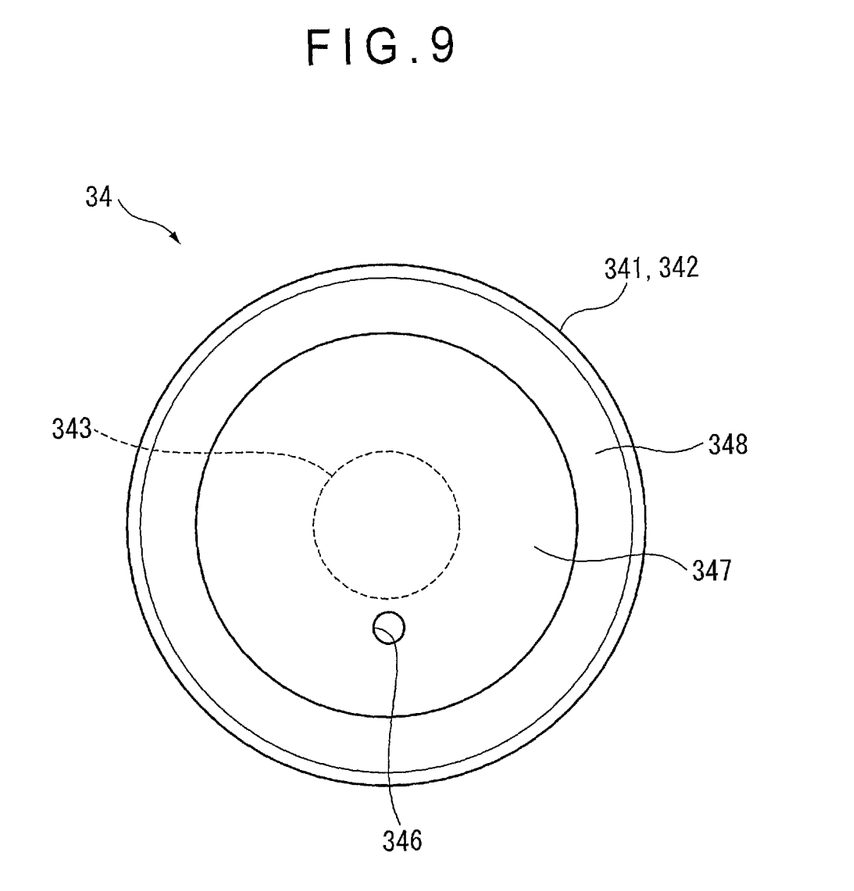
FIG. 9 is an enlarged front elevational view showing a sub slide surface and an air pocket according to the second exemplary embodiment.

As shown in FIG. 9, a surface of the slide plate 342 is concentrically divided into an outer section and an inner section. An annular slide surface 348 is formed to the outer section while a thin recessed air pocket 347 is formed to the inner section.

In the second exemplary embodiment, the slide surface 348 defines a sub slide surface of the invention, which slides solely on the Y-axis sub guide surface 24. The air pocket 347 defines an auxiliary pressure-receiving surface of the invention, which receives a shared portion of a load from the Y-axis sub guide surface 24 in a manner non-contact with the Y-axis sub guide surface 24.

Referring back to FIG. 8, the air pocket 347 forms a static-pressure air bearing with the opposing Y-axis sub guide surface 24 by a compressed air supplied from an external compressed-air source (e.g. a compressor and an accumulator: not shown), thereby sharing the load in a non-contact manner.

In the sub slide pad 33 (see FIG. 6) in the above-described first exemplary embodiment, the air passage 336 passing through the center axis of the guide rod 333 is used to introduce the compressed air into the air pocket 337. However, in the second exemplary embodiment, the introducing route of the compressed air is different from that in the first exemplary embodiment, and the compressed air flows through the above-described preload chamber 344.

The preload chamber 344 is a flat disc-shaped space defined between a backside (a side opposite to the air pocket 347) of the disc pad 341 and the guide block 345.

An O-ring 65 is disposed on a circumference of the disc pad 341 to provide a hermetic seal between the disc pad 341 and the guide block 345. Further, an O-ring 64 is disposed on a circumference of the guide rod 343 to provide a hermetic seal between the guide rod 343 and the guide block 345. These hermetic seals hermetically seal the preload chamber 344 from the outside.

Figure 10:
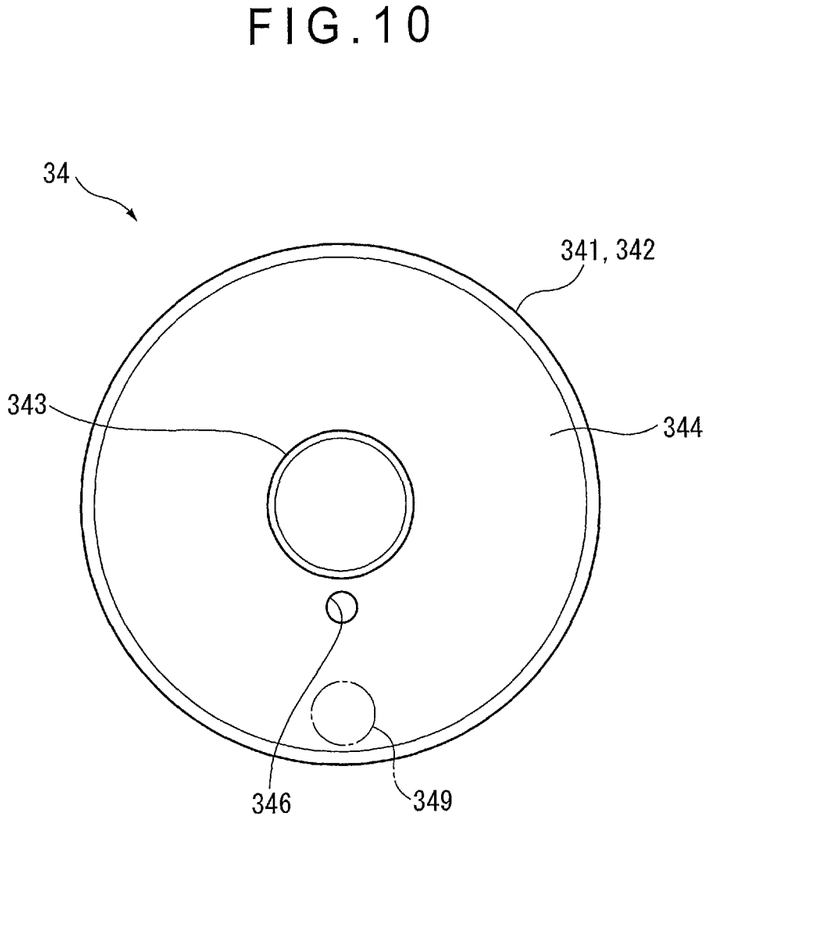
FIG. 10 is an enlarged rear elevational view showing a side of the sub slide pad facing a preload chamber according to the second exemplary embodiment.

As also shown in FIG. 10, the disc pad 341 is provided with a communication hole 346 intercommunicating an inside of the air pocket 347 and an inside of the preload chamber 344. Further, the guide block 345 is provided with a communication hole 349 intercommunicating the inside of the preload chamber 344 and a backside of the guide block 345.

Referring back to FIG. 8, an air tube 63 from a compressed air supply source (not shown) is connected to an opening of the communication hole 349 on the backside of the guide block 345 through the pipe joint 62.

Thus, the compressed air from the compressed air supply source is introduced from the air tube 63 through the pipe joint 62 and the communication hole 349 into the preload chamber 344, and further through the communication hole 346 into the air pocket 347.

The preload chamber 344 presses the disc pad 341 by the supplied compressed air toward the Y-axis sub guide surface 24, so that the surface (slide surface 348) of the slide plate 342 on the front side is pressed against the Y-axis sub guide surface 24 with a predetermined contact force. Accordingly, in the second exemplary embodiment, the compressed air supplied to the preload chamber 344 provides the function similar to that of the preload spring(s) 324 in the above-described first exemplary embodiment.

In the second exemplary embodiment, in order to achieve the above-described balance between the friction resistances, i.e. the relationship of N'/N=a/b, the preload chamber 344 and the air pocket 347 are designed in a predetermined manner.

Specifically, a relationship of S=So·[1−(a/b)] is established, where: a denotes a distance between the center C (see FIG. 2) of the feed screw 51 (i.e. the drive axis of the drive unit 5) and the Y-axis reference guide surface 23; b denotes a distance between the center C (i.e. the drive axis) and the Y-axis sub guide surface; N denotes the contact force between the Y-axis reference guide surface 23 and the reference slide pad 31; So denotes a pressure-receiving area on the backside of the disc pad 341 facing the preload chamber 344; and S denotes an opening area of the air pocket 347.

According to the sub slide pad 34 of the second exemplary embodiment, the contact force in the Y-axis direction is obtained using the preload chamber 344 supplied with the compressed air and the contact force can be shared by the air pocket 347 to which the same compressed air is supplied.

As described above, the pressure-receiving area So on the backside of the disc pad 341 facing the preload chamber 344 and the opening area S of the air pocket 347 are defined so that the relationship of S=So·[1−(a/b)] is satisfied. When both sides of the formula are multiplied by the pressure Ps of the compressed air, the formula is modified as Ps·S=Ps·So·[1−(a/b)]. Ps·S represents the contact force (N−N') shared by the air pocket 347. Ps·So represents a preload, i.e. the contact force N. Accordingly, (N−N')=N[1−(a/b)], which can be modified as N'=N(a/b), where the relationship of N'/N=a/b is satisfied.

As described above, in the second exemplary embodiment, by setting the pressure-receiving area of the disc pad 341 in the preload chamber 344 and the opening area of the air pocket 347 according to the above formula, the share ratio of the contact force by the air pocket 347 (auxiliary pressure-receiving surface) can be appropriately adjusted, so that the resultant force of the friction resistances of the reference slide pads 31 and the sub slide pads 34 can be aligned with the center of the drive force by the feed screw 51, thereby avoiding the generation of the moment.

It should be noted that, even when the above formula is not fully met, a reasonably proper balance can be ensured as long as a similar value is obtained, so that the performance of the slide guide device can be expected to be improved.

Further, in the second exemplary embodiment, the preload to be the contact force N can be applied by the preload chamber 344 between the reference slide pads 31 and the sub slide pads 34. In this arrangement, since the preload applied by the preload chamber 344 is based on the pressure Ps of the compressed air supplied to the air pocket 347, even when the pressure Ps of the compressed air is fluctuated, the preload can automatically follow the fluctuation.

Accordingly, it is not necessary to adjust the preload irrespective of the fluctuation in the pressure Ps of the compressed air, so that an adjustment at the time of manufacture or operation can be simplified.

It should also be noted that, in the second exemplary embodiment, though the moment due to the friction resistances can be avoided irrespective of the value of the pressure Ps of the compressed air, when, for instance, the pressure Ps becomes excessively large, the contact force N=Ps·So also becomes excessively large, so that the slide movement of the reference slide pad 31 on the slide surface 318 or of the sub slide pad 34 on the slide surface 348 accompanying a solid-contact is greatly and disadvantageously influenced. Accordingly, when the compressed air is supplied, it is preferable that the pressure Ps is adjusted as necessary so that the slide condition of the reference slide pad 31 on the slide surface 318 or the slide condition of the sub slide pad 34 on the slide surface 348 becomes appropriate.

Modification(s)

It should be understood that the scope of the present invention is not limited to the above-described exemplary embodiment(s) but includes modifications and the like as long as the modifications and the like are compatible with the invention.

In the above-described exemplary embodiments, the auxiliary pressure-receiving surface (air pockets 337, 347) are surrounded by the annular sub slide surface (slide surfaces 338, 348). However, such a concentric arrangement is not requisite for the invention. For instance, the section for the air pocket 337 (347) may be, for instance, juxtaposed with the section of the sub slide surface.

Further, it is not necessary for the auxiliary pressure-receiving surface to use pneumatic pressure such as the air pockets 337, 347, but the auxiliary pressure-receiving surface may alternatively be those using fluid pressure such as a liquid pocket to which pressurizing hydraulic oil is supplied.

Further, the auxiliary pressure-receiving surface may be arranged in any manner as long as the auxiliary pressure-receiving surface is capable of sharing the load between the sub slide pad and the sub guide surface with the sub slide surface and provides no slide resistance in the guidance direction (i.e. the movement direction of the slider relative to the guide body). For instance, other structure capable of receiving the pressure without causing a solid-contact such as a structure capable of receiving the pressure in a non-contact manner by a repulsive force of magnets may be used.

In the above exemplary embodiments, the reference slide pad 31 and the sub slide pad 32 are used in order to hold the guide body 2 in the X-axis direction, and the sub slide pad 32 has no auxiliary pressure-receiving surface described in the invention. This is because the feed screw 51 (drive axis) is designed to be located in the middle in the X-axis direction and, consequently, the resultant force of the friction resistances of the reference slide pad 31 and the sub slide pad 32 is aligned with the drive axis.

However, when the feed screw 51 is located close to the reference slide pad 31, the sub slide pad 33 (34) of the invention may be used in place of the sub slide pad 32, thereby restraining the moment of the slider 3 by balancing the above-described friction resistances in the Y-axis direction.

It should be noted that, when the feed screw 51 is disposed close to the sub slide pad 32, since the adjustment by sharing the contact force by providing the auxiliary pressure-receiving surface is not effective, the locations of the X-axis reference guide surface 21 and the X-axis sub guide surface 22 and the locations of the reference slide pad 31 and the sub slide pad 33 (34) may be switched to effect the adjustment.

What is claimed is:

1. A slide guide device comprising:
   a guide body comprising a reference guide surface and a sub guide surface that are parallel to each other;
   a slider comprising a reference slide pad configured to slide on the reference guide surface and a sub slide pad configured to slide on the sub guide surface, the slider being configured to be driven by a drive unit to move along the guide body, wherein the sub slide pad comprises: a sub slide surface that is configured to slide on the sub guide surface; and an auxiliary pressure-receiving surface that is configured to receive a load from the sub guide surface in a non-contact manner with the sub guide surface; and
   a preload mechanism that is configured to apply a preload between the reference guide surface and the reference slide pad,
   wherein a formula of $N'/N=a/b$ is satisfied, where: a denotes a distance between a drive axis of the drive unit and the reference guide surface; b denotes a distance between the drive axis and the sub guide surface; N denotes a contact force between the reference guide surface and the reference slide pad; and N' denotes a contact force between the sub guide surface and the sub slide surface.

2. The slide guide device according to claim 1, wherein
   the sub slide surface is provided in an annular shape surrounding the auxiliary pressure-receiving surface, and
   an air pocket to which a compressed air is supplied from an outside is formed on the auxiliary pressure-receiving surface.

3. The slide guide device according to claim 2, wherein
   an opening area S of the air pocket is set according to a formula of $S=N[1-(a/b)]/Ps$, where: a denotes the distance between the drive axis of the drive unit and the reference guide surface; b denotes the distance between the drive axis and the sub guide surface; N denotes the contact force between the reference guide surface and the reference slide pad; and Ps denotes a pressure of the compressed air.

4. The slide guide device according to claim 2, wherein
   the sub slide pad is supported by the slider in an advanceable and retractable manner in a direction orthogonal to the sub slide surface,
   a preload chamber is defined between a side of the sub slide pad opposite the sub slide surface and the slider, and
   the compressed air is supplied through the preload chamber to the air pocket.

5. The slide guide device according to claim 4, wherein
   an opening area S of the air pocket is set according to a formula of $S=So \cdot [1-(a/b)]$, where: a represents the distance between the drive axis of the drive unit and the reference guide surface; b represents the distance between the drive axis and the sub guide surface; and So represents a pressure-receiving area of the sub slide pad facing the preload chamber.

* * * * *